(12) United States Patent
Hashimoto

(10) Patent No.: US 6,397,149 B1
(45) Date of Patent: May 28, 2002

(54) PROCESSIONAL TRAVEL CONTROL APPARATUS

(75) Inventor: Hideki Hashimoto, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/565,809

(22) Filed: May 5, 2000

(30) Foreign Application Priority Data

May 7, 1999 (JP) ............................................ 11-127786

(51) Int. Cl.[7] .......................... G06F 17/10; G06F 7/78; H04B 1/034
(52) U.S. Cl. ........................................ 701/300; 455/99
(58) Field of Search .............................. 701/1–2, 19–20, 701/22–24, 93, 96, 117–119, 213–215, 300–302; 340/435, 901–905, 932.2–936, 988–989, 991–994; 180/167–169, 14.1–14.2, 14.7; 455/403–404, 91, 99; 375/130–138

(56) References Cited

U.S. PATENT DOCUMENTS

| | | | | |
|---|---|---|---|---|
| 5,054,109 A | * | 10/1991 | Blackburn | 455/17 |
| 5,295,551 A | * | 3/1994 | Sukonick | 180/167 |
| 5,493,694 A | * | 2/1996 | Vlcek et al. | 455/521 |
| 5,589,827 A | * | 12/1996 | Scurati | 340/901 |

FOREIGN PATENT DOCUMENTS

| | | |
|---|---|---|
| EP | 0652543 A | 10/1995 |
| EP | 0698542 A | 10/1996 |

* cited by examiner

Primary Examiner—William A. Cuchlinski, Jr.
Assistant Examiner—Thu Nguyen
(74) Attorney, Agent, or Firm—Carrier, Blackman & Associates, P.C.; Joseph P. Carrier; William D. Blackman

(57) ABSTRACT

A processional travel control apparatus allows processional travel with a leading vehicle driven by a driver and at least one succeeding vehicle automatically following the leading vehicle, while maintaining distances and directions between the vehicles by means of radar devices. The leading vehicle and the succeeding vehicles constitute a group. Each of the vehicles comprises a vehicle group identifying device for distinguishing the vehicle group from another vehicle group, the vehicle group identifying device preventing radio interference between the groups during processional travel.

17 Claims, 15 Drawing Sheets

FIG. 4

| |
|---|
| NUMBER OF TRANSMITTED BYTES |
| VEHICLE ID |
| VEHICLE No. |
| RANK IN PROCESSION |
| VEHICLE NO. HAVING THE NEXT TRANSMISSION RIGHT |
| VEHICLE INFORMATION (VEHICLE SPEED) |
| VEHICLE INFORMATION (STEERING ANGLE) |
| VEHICLE INFORMATION (X-COORDINATE) |
| VEHICLE INFORMATION (Y-COORDINATE) |
| VEHICLE INFORMATION (VEHICLE DIRECTION) |
| VEHICLE INFORMATION (BRAKE INFORMATION) |
| ⋮ |
| CHECK INFORMATION (CRC, etc.) |

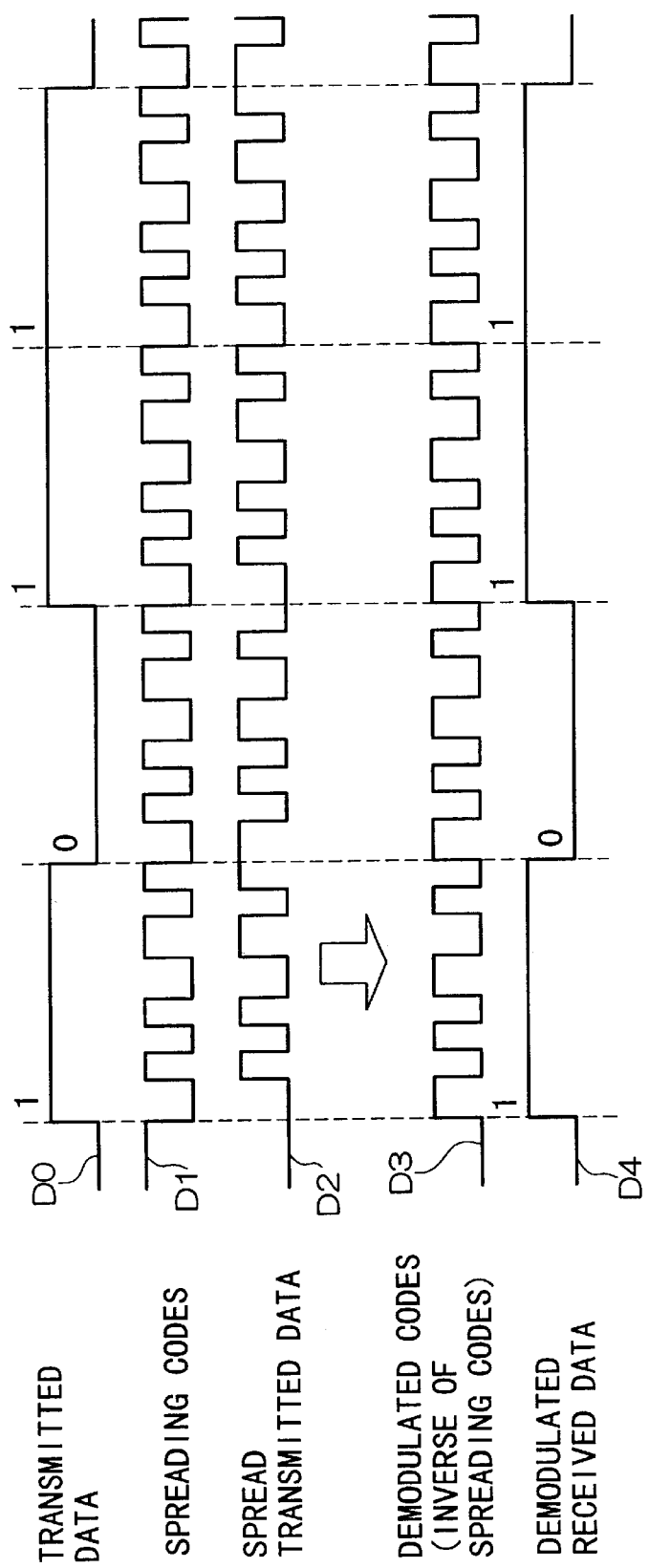

PROCESSIONAL TRAVEL CONTROL APPARATUS

BACKGROUND OF THE INVENTION

1. Field of the Invention

The present invention relates to a processional travel control apparatus which allows processional travel with a leading vehicle driven by a driver and at least one succeeding vehicle automatically following the leading vehicle, which handles the leading vehicle and the succeeding vehicle as a vehicle group, and which has a vehicle group identifying device to distinguish this vehicle group from another group.

This application is based on Japanese Patent Application No. Hei 11-127786.

2. Description of the Related Art

In recent years, environmental problems have been highlighted, and a technique for sharing electric vehicles within a certain area has been proposed to reduce problems of air pollution and traffic congestion. This type of technique for using shared vehicles requires a port (parking lot) for lending and returning the shared vehicles, and it is necessary to arrange a certain number of vehicles in each of these ports with respect to their utilization by users.

Generally, it is expected that ports for parking shared vehicles for this purpose will be provided in places where users converge, for example, in the vicinity of a train station and the like. There is no problem if the usage time and usage frequency by the users are consistent in each port, however, if there is any variance, then there is a situation in which shared vehicles accumulate in a certain port. To solve this problem, a technique is proposed for arranging shared vehicles available for rent in appropriate ports as evenly as possible, whereby the vehicles are moved between ports by having a vehicle driven by a driver at the head of a procession and a plurality of driverless vehicles following (refer to Japanese Patent Application, First Publication No. Hei. 5- 170008).

When travelling in a procession where succeeding vehicles follow a leading vehicle at the head, a system is used in which the succeeding vehicles trace the path of the leading vehicle. The leading vehicle sends vehicle speed, steering angle, vehicle position coordinates, direction, amount of torque required, brake pressure, and the like by vehicle to vehicle communication, to the succeeding vehicles, and the succeeding vehicles follow the leading vehicle while correcting the position and direction information of vehicles in front obtained by radar.

In the conventional processional travel control system, the vehicle to vehicle communication between the vehicles traveling in a procession is limited to a specified frequency band, e.g., a frequency band of 2.484 MHz for a radio LAN for mobile communication. Even when a plurality of processions of vehicles travel while conducting the vehicle to vehicle communication, radio interference does not generally occur because the coverage of radio waves for a radio LAN is limited to approximately several hundred meters. However, when the processions travel in a narrow area within the coverage of the radio waves, the radio interference may occur because the frequency band for a radio LAN is restricted as mentioned above.

To avoid this, a control apparatus may control the entire system, and may manage departure times and routes so that a plurality of processions of vehicles do not cross and do not travel parallel to each other. However, this system lacks flexibility, and may cause problems, e.g., when the processions of vehicles encounter each other as traffic conditions vary.

Further, the succeeding vehicles follow the leading vehicle while correcting the position and direction information of vehicles in front obtained by radar, and while detecting the relationship of the positions between the succeeding vehicles and the leading vehicle. In this case, there is the problem that the succeeding vehicles may receive radio waves transmitted from radar devices of the vehicles in another procession, which may cause an error in distinguishing the leading vehicle from the others.

BRIEF SUMMARY OF THE INVENTION

It is therefore an object of the present invention to provide a processional travel control apparatus which can distinguish respective vehicle groups traveling in processions.

In a first aspect of the invention, the processional travel control apparatus allows processional travel with a leading vehicle (101, 101A, and 101B in the embodiments) driven by a driver and at least one succeeding vehicle (102, 102A, 102B, 103, 103A, and 103B in the embodiments) automatically following the leading vehicle, while maintaining distances and directions between the vehicles by means of radar devices (a laser radar 2, and a reflector 3 in the embodiments). The leading vehicle and the succeeding vehicle(s) constitute a group (first and second vehicle groups A and B in the embodiment). Each of the vehicles comprises a vehicle group identifying device for distinguishing a vehicle group from another vehicle group, the vehicle group identifying device (the radar device which can switch modulation as shown in FIG. 14) preventing radio interference between the groups during processional travel.

According to this construction, by means of the vehicle group identifying device, the vehicles which constitute the vehicle group can determine whether the data from the radar device is sent from their own vehicle group or not.

Even when vehicle groups approach each other, the interference in the radio data, transmitted from the radar device, with those from vehicles in another vehicle group, can be prevented. Therefore, the processional travel can be reliably conducted without being affected by another procession.

In a second aspect of the invention, the processional travel control apparatus allows processional travel with a leading vehicle driven by a driver and at least one succeeding vehicle automatically following the leading vehicle, while the vehicles communicate with each other by vehicle to vehicle communication. The leading vehicle and the succeeding vehicles constitute a group. Each of the vehicles comprises a vehicle group identifying device for distinguishing a vehicle group from another vehicle group, the vehicle group identifying device preventing radio interference between the groups during the processional travel.

The vehicle group identifying device uses, e.g., vehicle to vehicle communication using multi-channel communication (shown in FIGS. 5A, 5B), vehicle to vehicle communication using a spread spectrum (shown in FIGS. 6A, 6B), or a technique for adjusting communication timings and interrupting the communication (shown in FIG. 11).

According to this construction, by means of the vehicle group identifying device, the vehicles which constitute the vehicle group can determine whether the data from the radar device is sent from their own vehicle group or not.

Even when vehicle groups approach each other, radio interference in the vehicle to vehicle communication can be prevented, and the problem that the vehicles receive the data transmitted from vehicles in other vehicle group can be avoided.

In a third aspect of the invention, the processional travel control apparatus allows processional travel with a leading vehicle driven by a driver and at least one succeeding vehicle automatically following the leading vehicle, while the vehicles communicate with each other by vehicle to vehicle communication, and while maintaining distances and directions between the vehicles by means of radar devices. The leading vehicle and the succeeding vehicles constitute a group. Each of the vehicles comprises a vehicle group identifying device for distinguishing a vehicle group from another vehicle group, the vehicle group identifying device preventing radio interference between the groups during the processional travel.

According to this construction, by means of the vehicle group identifying device, the vehicles which constitute the vehicle group can determine whether the data in the vehicle to vehicle communication, or from the radar device is sent from their own vehicle group or not.

Even when vehicle groups approach each other, the radio interference in the vehicle to vehicle communication can be prevented, and the problem that the vehicles receive the radar waves from radar devices of vehicles in other vehicle groups can be avoided.

In a fourth aspect of the invention, the apparatus further comprises: a control device (e.g., a control device K in the embodiments) for detecting the position of a traveling vehicle group; and an approach determining device (e.g., step S43 in the embodiments) for determining whether the vehicle group is approaching another vehicle group so that radio interference will occur in vehicle to vehicle communication or in communication using radar devices in the vehicle group. When the approach determining device determines that the vehicle groups are approaching each other so that the radio interference will occur, the vehicle group identifying device identifies the respective vehicle groups which approach each other when traveling in processions.

According to this construction, the approach determining device determines whether the radio interference between the vehicle groups which approach each other will occur or not. Only when the radio interference will occur, the vehicle group identifying device identifies the respective vehicle groups. Thus, the invention simplifies the control of identifying the respective vehicle groups.

BRIEF DESCRIPTION OF THE DRAWINGS

FIG. 4 is a diagram showing an example of the communication data format in the present invention.

FIG. 5A shows a transmitter, and FIG. 5B shows a receiver.

FIG. 6A shows a transmitter, and FIG. 6B shows a receiver.

FIG. 7 is a time chart showing the direct sequence technique of the spread spectrum of the second embodiment.

FIG. 13A shows a step pattern AP, and FIG. 13B shows a step pattern BP.

FIG. 14A shows a transmitter, and FIG. 14B shows a receiver.

DETAILED DESCRIPTION OF THE INVENTION

Figure 1:
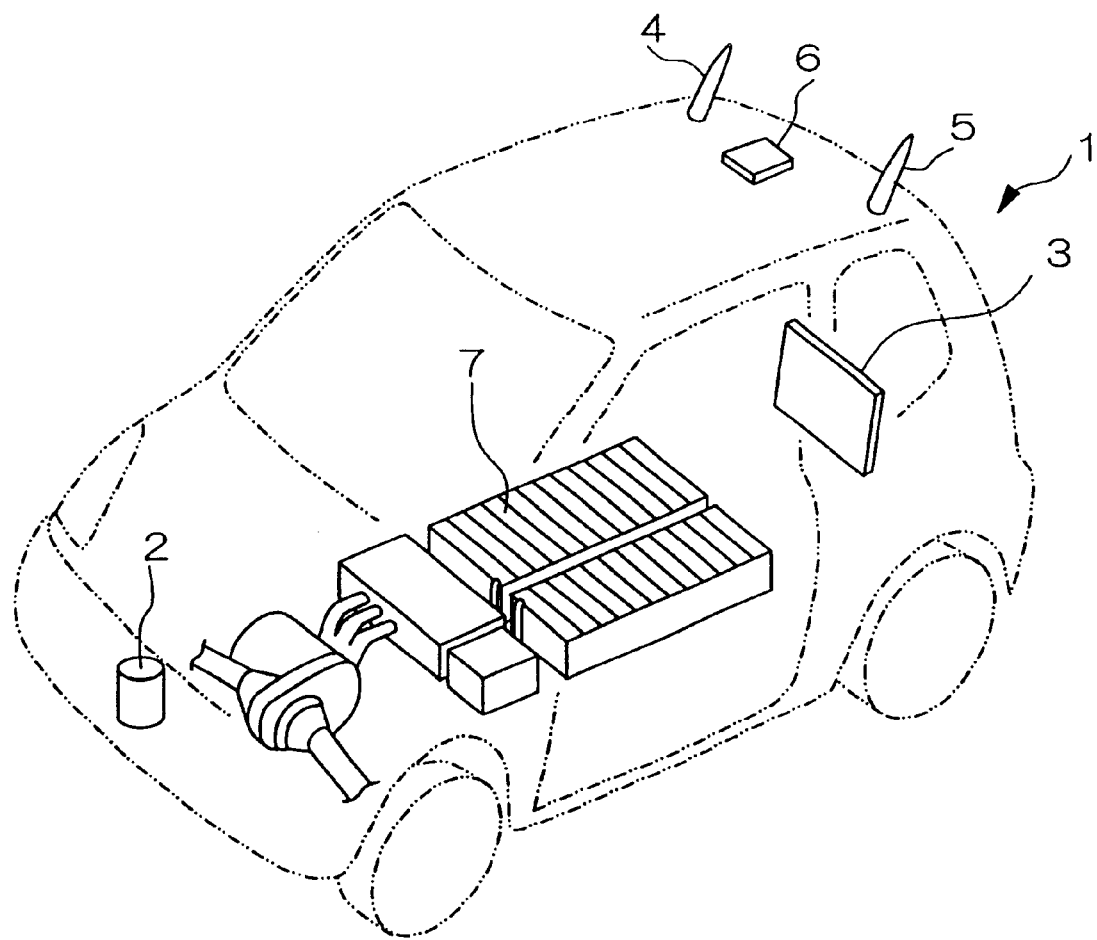
FIG. 1 is a diagram showing an electric vehicle of the embodiment according to the present invention.

Hereinafter, the embodiments of the present invention are described with reference to the drawings. FIG. 1 shows an electric vehicle 1 capable of traveling in a procession, which is fitted with a laser radar 2 in the center of the front bumper capable of wide angle scanning, and a reflector 3 in the center of the rear bumper, being a plate with a mirror finish for reflecting a radar wave emitted by a laser radar 2 of a succeeding vehicle. By picking up the location of the reflector 3 (radar measuring point) of a preceding vehicle (vehicle in front of that vehicle) in real time using the laser radar 2 of the succeeding vehicle, it is possible for the succeeding vehicle to detect the location of the preceding vehicle (the distance from the preceding vehicle) and its direction in real time.

Figure 2:
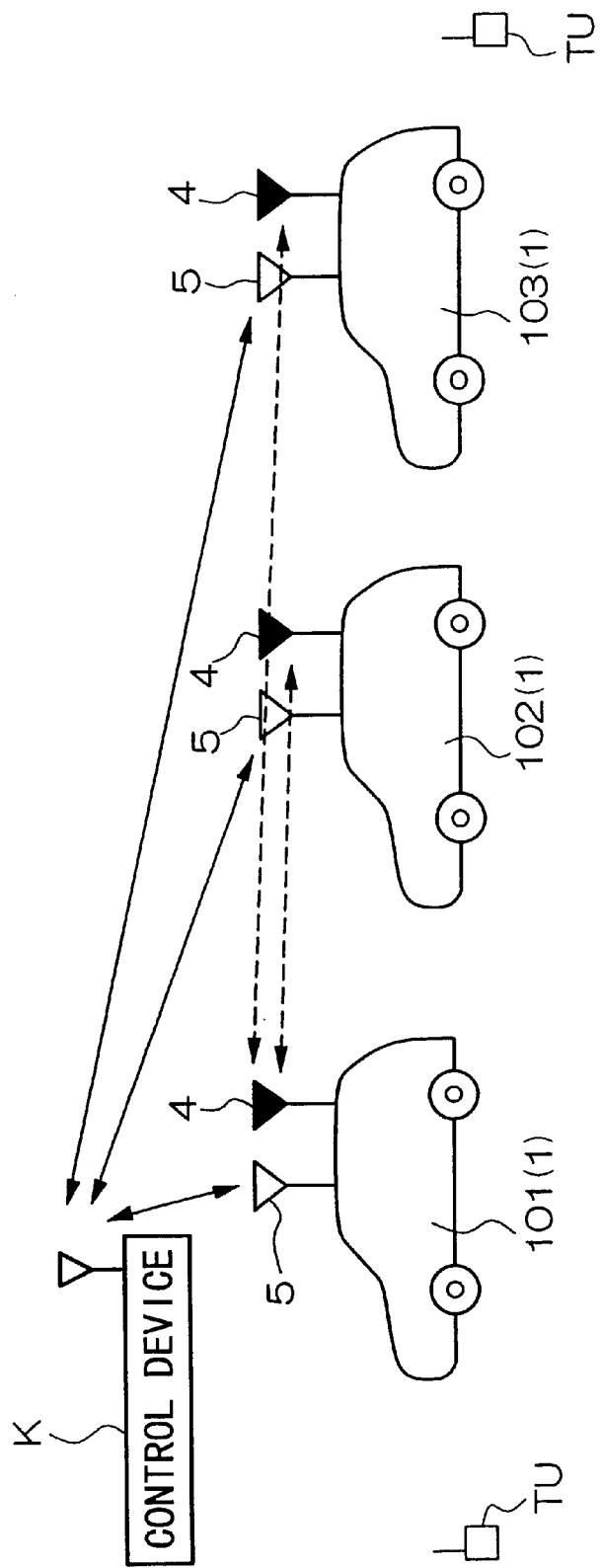
FIG. 2 is a diagram for explaining the communication when vehicles travels in a procession in the present invention.

Installed in the roof of the electric vehicle 1 are; a vehicle to vehicle antenna 4 for radio communication between electric vehicles 1 (vehicle to vehicle communication), a road to vehicle antenna 5 for radio communication with communication devices TU, a control device K, or the like arranged along a road as shown in FIG. 2, and a GPS/DGPS antenna 6 for receiving radio waves from GPS satellites and DGPS stations. Here, 7 is a battery.

FIG. 2 shows the vehicle traveling in a procession. A plurality or group of electric vehicles travels in a procession by merging vehicle to vehicle communication information such as vehicle speed, steering angle, and vehicle position coordinates of the preceding vehicles, obtained from the vehicle to vehicle communication using the radio LAN as mentioned above, with information obtained from the laser radar 2 and the reflector 3, and by tracing the paths of the preceding or leading vehicle, based on the merged information.

Here, among electric vehicles 1 in the traveling procession, an electric vehicle 1 that is driven by a driver and travels at the head is called a leading vehicle 101, an electric vehicle 1 following the leading vehicle 101 is called a succeeding vehicle 102, and an electric vehicle following the succeeding vehicle 102 is called a succeeding vehicle 103. These leading vehicle 101, and the succeeding vehicles 102 and 103 are electric vehicles 1 having the same specifications (the same structure). In FIG. 2, the solid lines indicate the road to vehicle communication (which is the communication between the vehicle and the control device, and may be another type of radio communication), and the dashed lines indicate the vehicle to vehicle communication.

Next is a description of the procedure of the vehicle to vehicle communication between the leading vehicle 101 and the succeeding vehicles 102 and 103 during processional travel.

(1) The leading vehicle 101 transmits (broadcasts), and then passes transmission rights to the succeeding vehicle 102. Here, the transmitted information from the leading vehicle 101 is transmitted to both the succeeding vehicles 102 and 103.

(2) Next, the succeeding vehicle 102 transmits, and then passes transmission rights to the leading vehicle 101. The transmitted information from the succeeding vehicle 102 is transmitted to both the leading vehicle 101 and the succeeding vehicle 103.

(3) The leading vehicle 101 transmits again, and then passes transmission rights to the succeeding vehicle 103.

(4) Next, the succeeding vehicle 103 transmits, and then passes transmission rights to the succeeding leading vehicle 101. The transmitted information from the succeeding vehicle 103 is transmitted to both the leading vehicle 101 and the succeeding vehicle 102.

(5) The above procedure is then repeated.

While the description of the embodiment is made for the case of three vehicles in the procession, a procession of four or more vehicles may perform the communication according to the same procedure.

Figure 3:
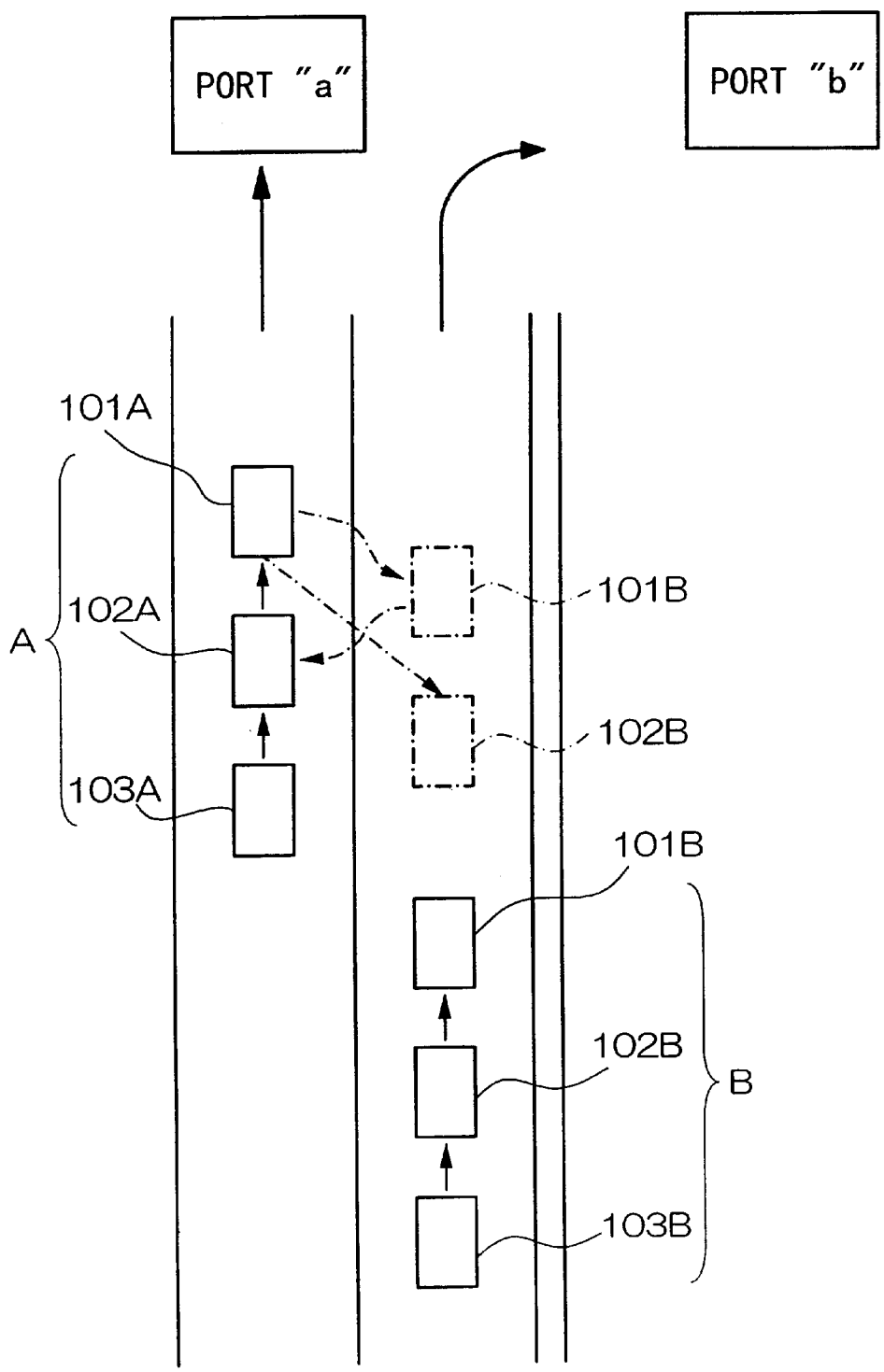
FIG. 3 is a diagram for explaining the processional travel in the present invention.

In FIG. 3, when a first vehicle group A traveling in a procession goes straight on a road toward a port "a" ahead, a second vehicle group B, traveling in a procession at a higher speed than the first vehicle group A, catches up with the first vehicle group A, and travels parallel to them. The second vehicle group B is going to turn right toward a port "b." As described above, since the first and second groups A and B of the electric vehicles travel in processions, the vehicles perform the vehicle to vehicle communication. Therefore, the vehicle to vehicle communication may cause radio interference between the first group A and the second group B as shown by the dashed lines.

The first embodiment divides the frequency band for the vehicle to vehicle communication into a plurality of bands, and uses different bands for the respective groups, Here, the vehicle to vehicle communication is entirely managed by a control device K, (see FIGS. 5A, 5B, 6A, 6B, 14A, 14B) the settings of all the vehicles are the same when starting the processional travel, and, only when the vehicle groups approach each other, this approach is notified via the road to vehicle communication, and then the respective vehicle groups use two different frequency bands. This process for changing the frequency bands will be specifically explained later. When the number of the available frequency bands is more than the number of the vehicle groups, the respective groups can be distinguished according to the differences in frequency. However, because the number of the vehicle groups is sometimes more than the number of the available frequency bands, the frequency bands are switched only when the vehicle groups approach each other.

As shown in FIG. 4, when performing the vehicle to vehicle communication, a vehicle ID is set in the communication data to identify the vehicle group. That is, the communication data includes the vehicle group ID which is unique to the group, and the respective vehicles in the group can recognize and separate data. The vehicle group ID is, e.g., a serial number assigned by the control device K, or the vehicle number of the leading vehicle in the group of vehicles in the procession, and must differ from the IDs of the other groups. Specifically, in the data format, the number of bytes transmitted from the vehicles, the vehicle group ID, the vehicle number, the rank in the procession, the vehicle number of the vehicle having the next transmission rights, the vehicle information (the vehicle speed, steering angle, X-position coordinate, Y-position coordinate, vehicle direction, brake information, and the like), check information such as CRC, and the like are set.

When starting the processional travel, the frequency band which is to be assigned according to the vehicle group ID is determined. When the vehicle groups approach each other, and when the frequency bands of the vehicle groups are the same, one of the frequencies is switched to the different frequency.

Specifically, the band of 2.484 MHz (the bandwidth: 2.471–2.497 MHz) which is the frequency band applicable to a radio LAN for mobile bodies is divided into an AS band whose range is 2.471–2.484 MHz and a BS band whose range is 2.484–2.497 MHz. Thus, these two frequency bands are allocated to the first vehicle group A and the second vehicle group B which approach each other, respectively, thereby preventing radio interference between the groups.

Figure 5A:
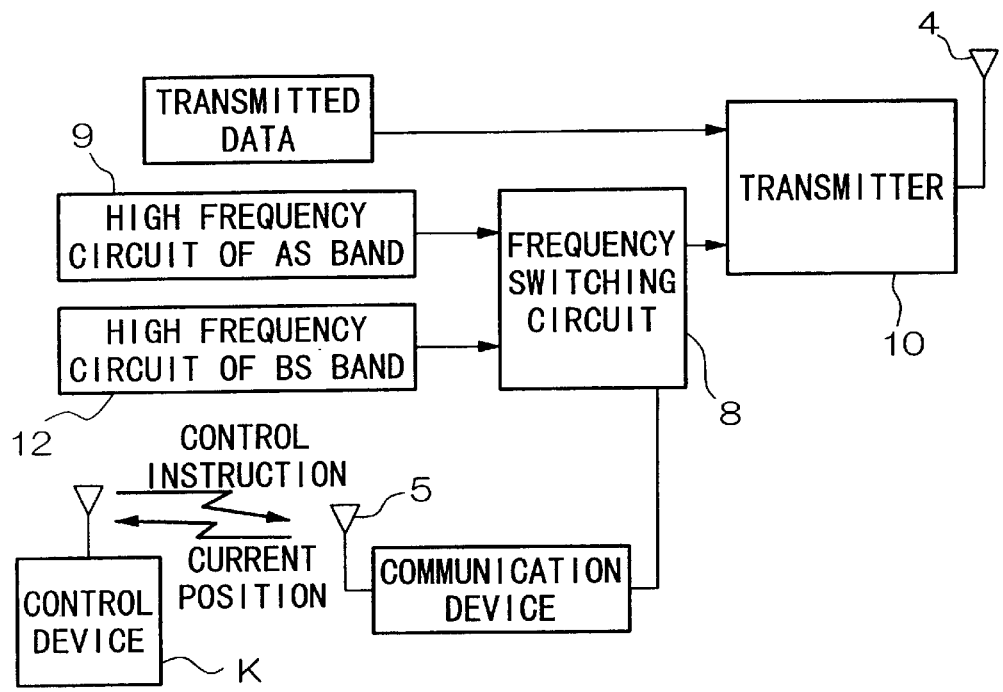
FIGS. 5A and 5B are block diagrams showing vehicle to vehicle communication using the multi-channel communication of the first embodiment of the present invention.
Figure 5B:
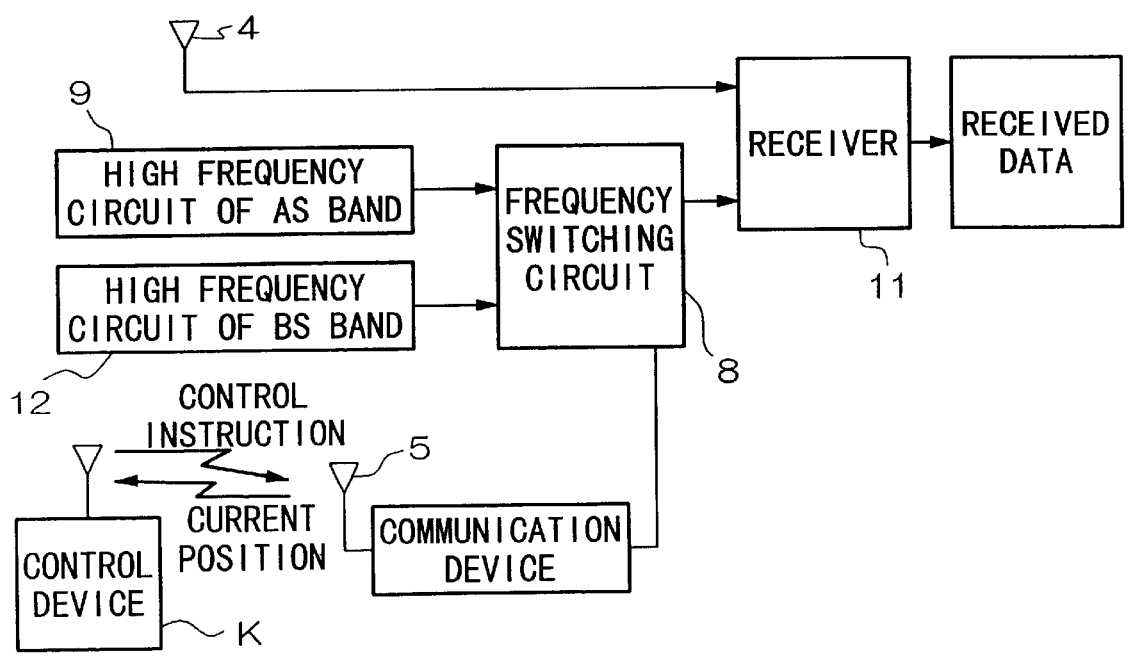

FIG. 5 is a diagram for explaining the construction of the communication device using multi-channel communication of the embodiment. FIG. 5A shows the transmitter of the vehicle to vehicle communication, and FIG. 5B shows the receiver of the vehicle to vehicle communication.

In FIG. 5A, before starting the processional travel, an instruction from the control device K is input to a frequency switching circuit 8 from the road to vehicle antenna 5 via the communication device, and a high frequency circuit 9 using the specified frequency AS band is selected, depending on the vehicle group ID. Therefore, in this vehicle group (e.g., vehicle group A), the data is transmitted from a transmitter 10 via the vehicle to vehicle antenna 4 at the radio frequency of the AS band. As shown in FIG. 5B, the transmitted data is received via the vehicle to vehicle antenna 4 by a receiver 11 of another electric vehicle 1 of the vehicle group A. The data is reliably received by the receiver 11 since the frequency switching circuit 8 has been switched according to the instruction sent from the control device K via the communication device so that the high frequency circuit 9 using the specified frequency AS band has been selected. Here, when transmitting the position of the vehicle group A, the position of the vehicle detected by the GPS/DGPS antenna 6 shown in FIG. 1 (which may be only the position of the leading vehicle) is transmitted from the road to vehicle antenna 5 shown in FIGS. 5A and 5B.

On the other hand, because the vehicle group B, which approaches the vehicle group A, receives an instruction from the control device K to select frequency circuits 12 using the BS band in both the transmitter and the receiver, the vehicle to vehicle communications in the vehicle group B and in the vehicle group A do not cause the radio interference. Thus, the respective vehicle group can be identified.

Next, the second embodiment uses the communication technique of spectrum spread (SS) in the vehicle to vehicle communication, and identifies the vehicle group by setting a spreading code sequence to a value unique to the vehicle group.

Spectrum spread is a technique for reliably transmitting at least a part of a message by intentionally spreading the transmitted signals over frequencies. Specifically, one of the two following techniques (frequency hopping, or direct spread) is used. Because these techniques allow common use of a specified frequency band (spectrum), a plurality of communications may be provided simultaneously at a low output. Further, this is also an effective measure for preventing noise and multi-path.

Frequency hopping (ss-FH) is a process of transmitting a carrier wave of normal narrow-band modulated signal. Direct sequence (spread) (ss-DS) is a process of performing secondary modulation (spreading) using a noise-like pulse train (spreading code/ PN) which is much faster than the input pulses into which information is coded. The receiver multiplies the received signal by the same PN sequence at the same timing as the transmitter (secondary demodulation). Thus, the original narrow-band modulated signal is produced. By setting different spreading codes for the respective vehicle groups forming processions, radio interference can be prevented between the vehicle groups, and the vehicle groups can be identified.

The direct sequence will be explained more specifically with reference to FIG. 6.

Figure 6A:
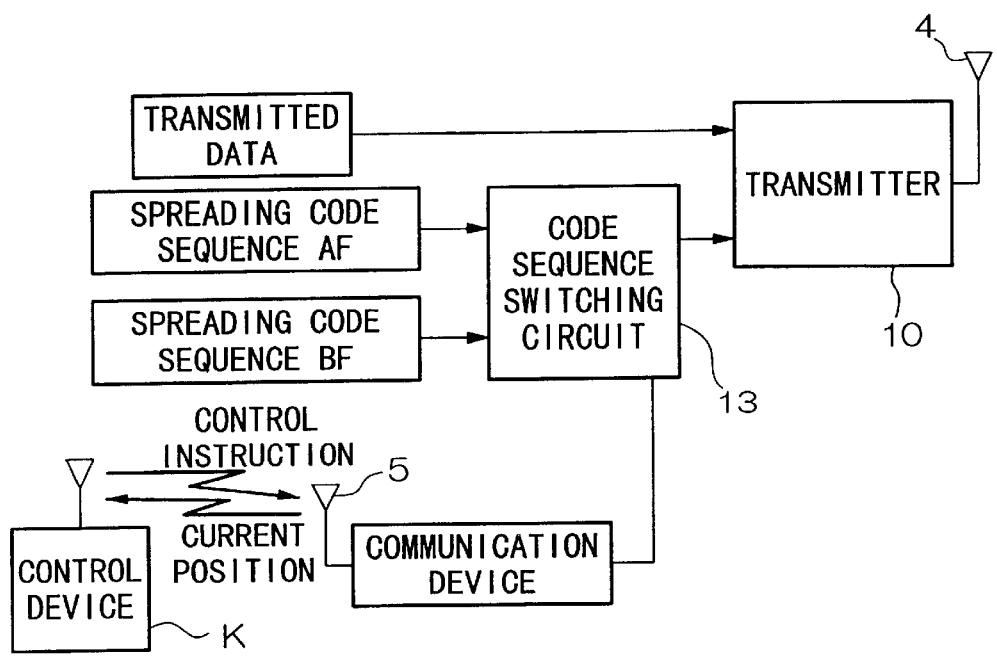
FIGS. 6A and 6B are block diagrams showing vehicle to vehicle communication using the spread spectrum of the second embodiment of the present invention.
Figure 6B:
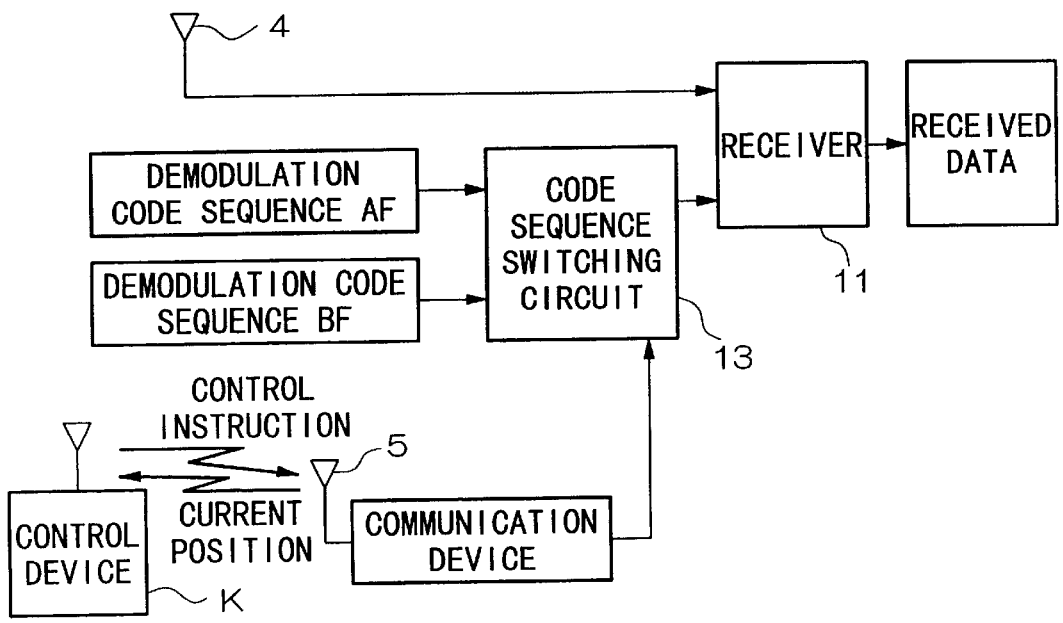

FIG. 6 is a diagram for explaining the construction of the communication device using the direct sequence. FIG. 6A shows a transmitter of the vehicle to vehicle communication, and FIG. 6B shows a receiver of the vehicle to vehicle communication.

Referring to FIG. 6A, an instruction from the control device K is input to a code switching circuit 13 from the road to vehicle antenna 5 via the communication device, and a spreading code sequence AF is selected. Therefore, in this vehicle group (e.g., vehicle group A), the data modulated with the spreading code sequence AF is transmitted by the transmitter 10 from the vehicle to vehicle antenna 4. As shown in FIG. 6B, the transmitted data is received by the receiver 11 of another electric vehicle 1 in the vehicle group A from the vehicle to vehicle antenna 4. The data is reliably received via the receiver 11, and is modulated, since the demodulation code sequence AF is selected as a demodulation code according to the instruction from the control device K via the communication device, corresponding to the transmitter. In a manner similar to the process shown in FIGS. 5A and 5B, the position of the vehicle detected by the GPS/DGPS antenna 6 shown in FIG. 1 (which may be only the position of the leading vehicle) is transmitted from the road to vehicle antenna 5 shown in FIGS. 6A and 6B to the control device K.

On the other hand, in the vehicle group B which is approaching the vehicle group A, the transmitter and the receiver are instructed to select a spreading code sequence BF and a demodulation code sequence BF according to the instruction from the control device K via the communication device. Therefore, the vehicle to vehicle communications in the vehicle group B and in the vehicle group A do not cause radio interference. Thus, the respective vehicle groups can be identified.

Next, the data transfer process using the direct sequence technique will be explained with reference to FIG. 7. Transmission data D0 is modulated with a spreading code (sequence) D1, and is thus converted into spread transmission data D2. The transmission data D2 is demodulated with a demodulation code (sequence) D3 (which is inverse data with respect to the spreading code sequence), and thus reception data D4 which is the same as the transmission data D0 can be obtained.

Figure 8:
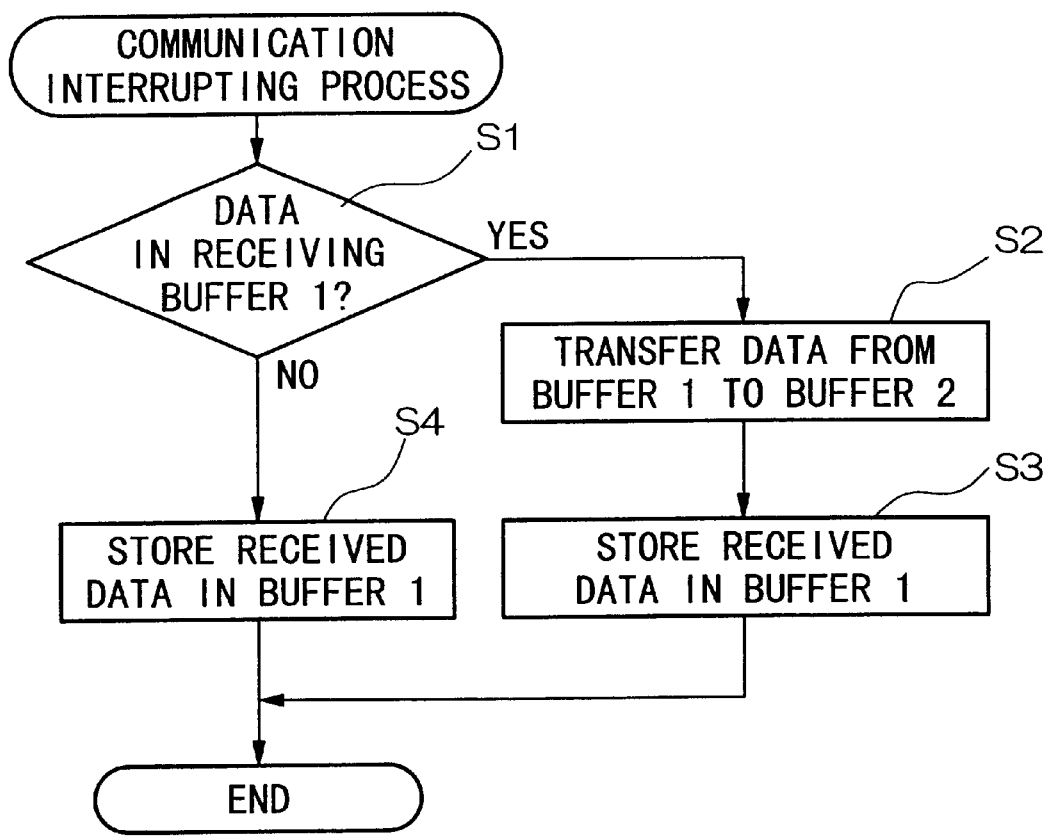
FIG. 8 is a flowchart showing the order of the communication of the third embodiment of the sent invention.
Figure 9:
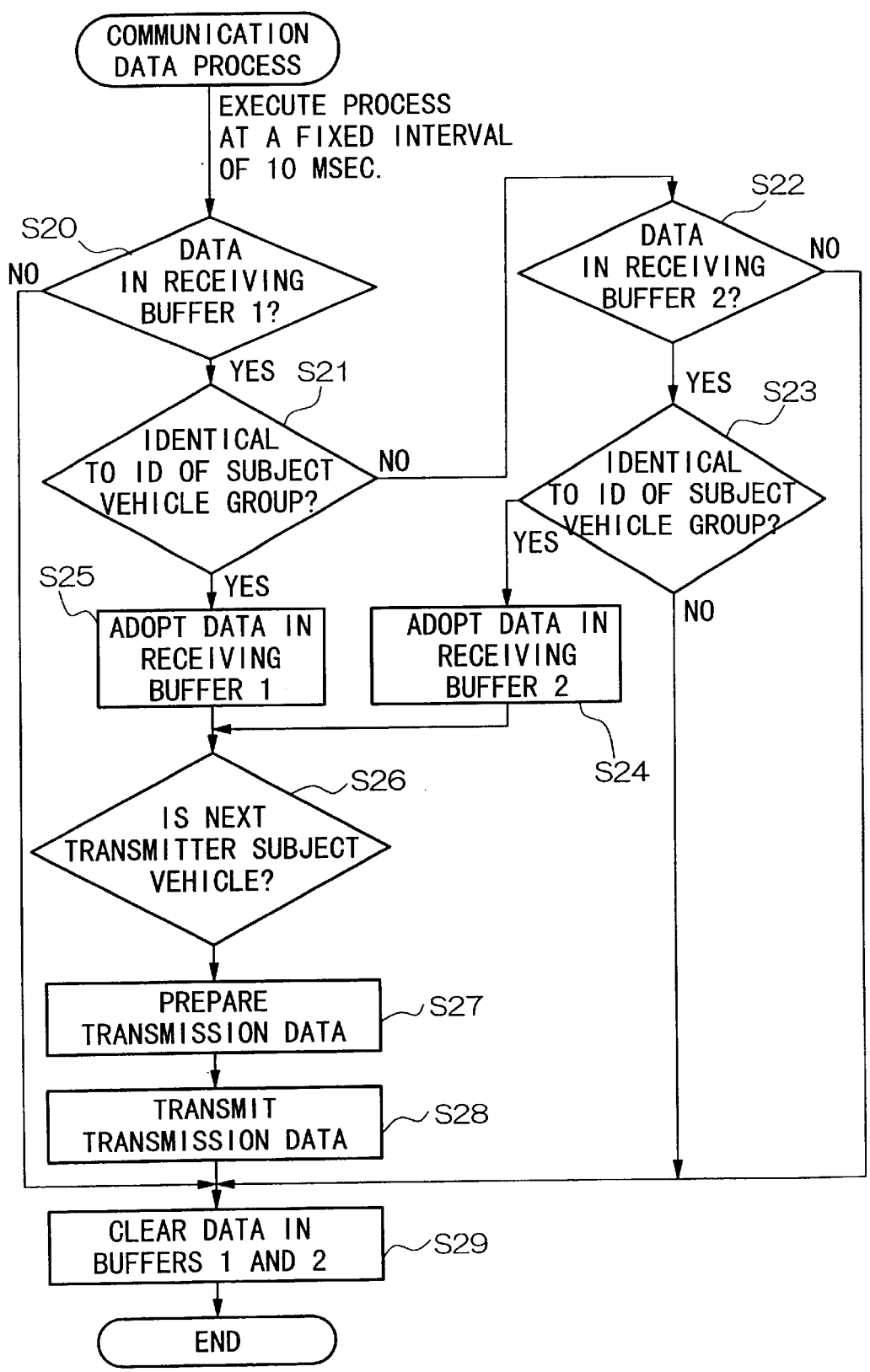
FIG. 9 is a flowchart showing the process for the communication data in the third embodiment.

The third embodiment as shown in FIGS. 8,9 sets a vehicle ID into communication data when performing the vehicle to vehicle communication, and identifies the vehicle group at specified timings interrupting a communication. The data format used in this embodiment is similar to that shown in FIG. 4.

The interruption process in the vehicle to vehicle communication in which the vehicle ID is set in the transmission data is conducted according to the flowcharts of FIGS. 8 and 9. In the interruption process conducted according to the flowchart of FIG. 8, in step S1, it is determined whether a receiving buffer No. 1 stores data or not. When in step S1 the receiving buffer No. 1 stores data, the flow proceeds to step S2, the data in the receiving buffer No. 1 is transferred to a receiving buffer No. 2, received data is stored in the receiving buffer No. 1 in step S3, and the process is completed.

When in step S1 the receiving buffer No. 1 does not store data, the flow proceeds to step S4, received data is stored in the receiving buffer No. 1, and the process is completed.

The communication data process is specifically conducted according to the flowchart of FIG. 9. In step S20, it is determined whether the receiving buffer No. 1 stores data or not. When in step S20 the receiving buffer No. 1 does not store data, the flow proceeds to step S29. When in step S20 the receiving buffer No. 1 stores data, the flow proceeds to step S21, and then it is determined whether the vehicle ID is identical to the ID of the subject group or not. When in step S21 the vehicle ID is not identical to the ID of the subject group, the flow proceeds to step S22, and then it is determined whether the receiving buffer No. 2 stores data. When in step S22 the receiving buffer No. 2 does not store data, the flow proceeds to step S29. When in step S22 the receiving buffer No. 2 stores data, the flow proceeds to step S23.

In step S23, it is determined whether the vehicle ID is identical to the ID of the subject group or not. When in step S23 the vehicle ID is identical to the ID of the subject vehicle group, the flow proceeds to step S24, then the data in the receiving buffer No. 2 is adopted, and the flow proceeds to step S26. When in step S23 the vehicle ID is not identical to the subject vehicle group, the flow proceeds to step S29.

When in step S21 the vehicle ID is identical to the ID of the subject vehicle group, the flow proceeds to step S25, then the data in the receiving buffer No. 1 is adopted, and the flow proceeds to step S26. In step S26, it is determined whether the next transmitter is the subject vehicle or not. When in step S26 the subject vehicle is not the next transmitter, the flow proceeds to step S29. When in step S26 the next transmitter is the subject vehicle, the transmission data is prepared in step S27, the transmission data is transmitted in step S28, the data in receiving buffers No. 1 and No. 2 are cleared in step S29, and the process is completed.

As described above, the received data is provisionally stored in two buffer memories, is read at an interval of, e.g., 10 msec, and is analyzed to determine which vehicle group the data belongs to. While two data must be reliably received within 10 msec., the interval between the fixed time processes may be 20 msec. when two signals cannot be received because of an inappropriate baud rate.

Figure 10:
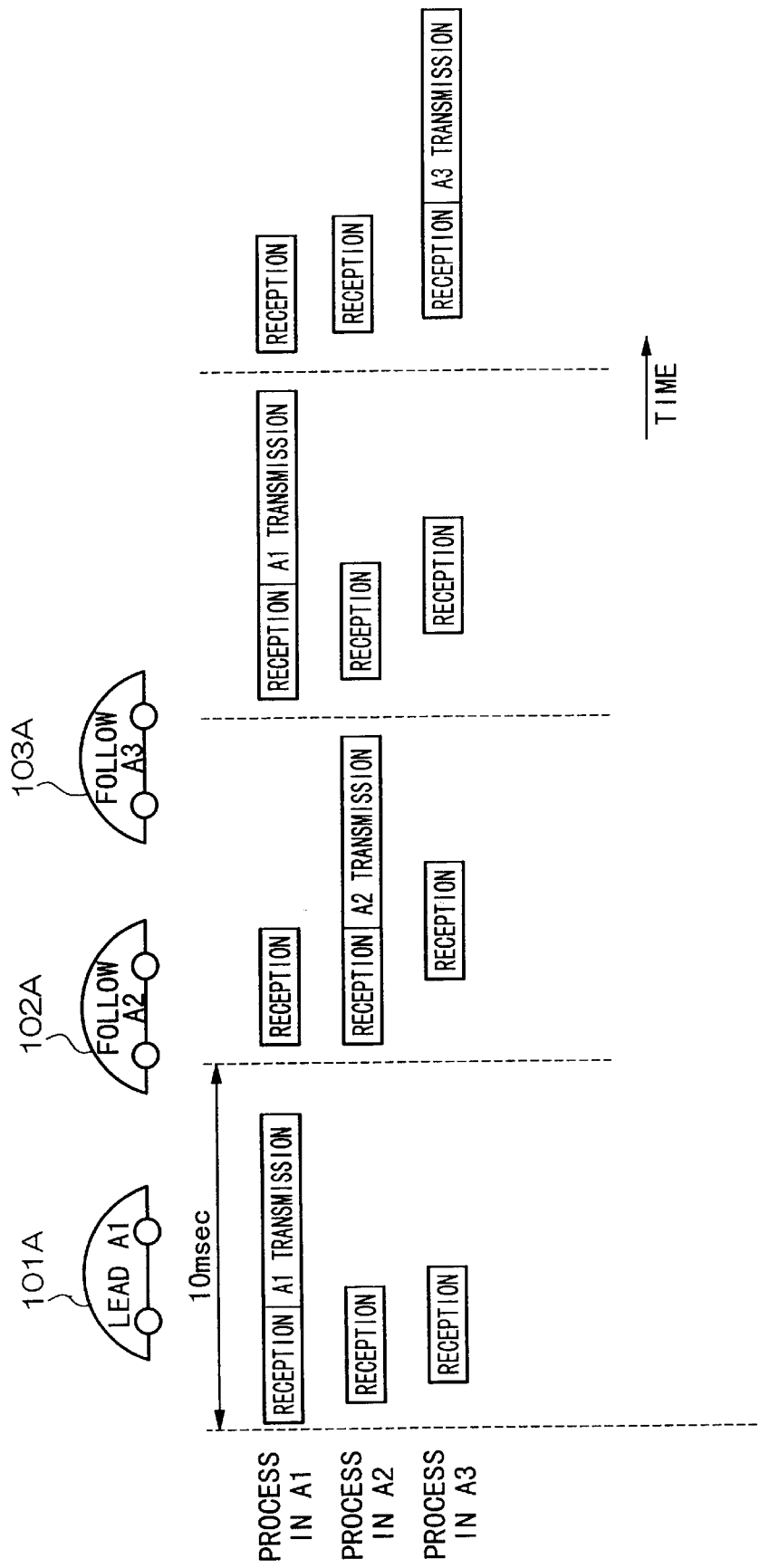
FIG. 10 is a timing chart showing the vehicle to vehicle communication when there is only one procession of vehicles according to the present invention.
Figure 11:
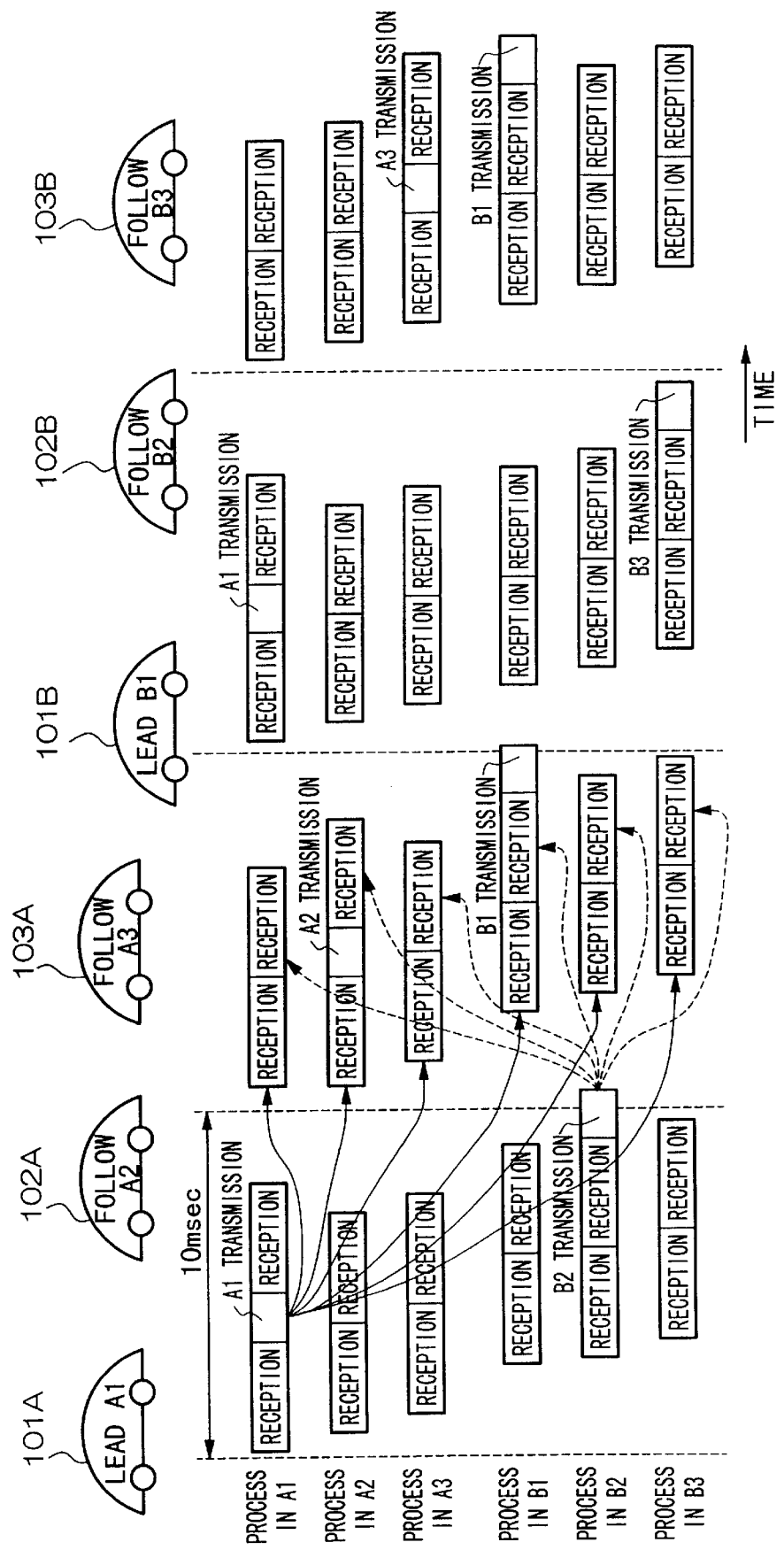
FIG. 11 is a timing chart showing the vehicle to vehicle communication when there are two processions of vehicles in the third embodiment of the present invention.

The communication timing is determined according to the timing charts of FIGS. 10 and 11. The timing chart of FIG. 10 shows the situation in which there is only one vehicle group, and the timing chart of FIG. 11 shows the situation in which there are two vehicle groups. Here, reference characters "A" and "B" are attached after reference numbers indicating vehicles to discriminate the respective groups. In FIGS. 10 and 11, for convenience, "LEAD" is attached to the leading vehicle, and "FOLLOW" is attached to the following vehicles, and the numbers indicating the order are added. In FIG. 10, the abscissa indicates time, and the interval between the fixed time processes is 10 msec. As described in FIG. 2, the transmission right is changed in the order of the leading vehicle 101A, the following vehicle 102A, the leading vehicle 101A, and the following vehicle 103A, and the transmissions are performed within the fixed process time.

FIG. 11 shows the situation in which a second procession B is added to (travels parallel to, or approaches) a first procession A. When two processions approach each other, the data transmitted from the vehicle having the transmission right is received by the vehicles in the other procession. As described above, once this data is received, it is determined whether the data belongs to the procession of the subject vehicle, by identifying the vehicle ID. Since the fixed process time is 10 msec as described above, when two processions approach each other, the data transmitted from both processions must be received within the fixed process time.

Therefore, the transmission timing is set according to FIG. 11. The process of the first procession A (the process of the second procession is similar) is different from that in FIG. 10 in that reception modes are added after the transmissions in the fixed time process. The reason for this is that the number of reception timings must be increased to receive data transmitted from two processions. Further, in the process carried out in the second procession B, the transmission timing is set so as not to interfere with the transmission timing of the first procession A within the fixed process time when the first procession transmits data.

In FIG. 11, in the first fixed process time, the data transmitted from the leading vehicle 101 A in the first procession A is received by the following vehicles 102A and 103A in the first procession A as shown with the solid lines, and is also received by all the vehicles 101B, 102B, and 103B in the second procession B. Further, in the fixed process time when the first procession A transmits data, the following vehicle 102B in the second procession B transmits the data at a different timing, and this data is received by all the vehicles in the first procession A, and by the leading vehicle 101B and the following vehicle 103B in the second procession B.

Thus, by making the communication timings of two processions different, and increasing the number of the receiving timings, two respective groups can be identified while maintaining the vehicle to vehicle communications in two processions.

As shown in FIG. 3, when the first vehicle group A traveling in a procession goes straight on a road toward a port "a" ahead, a second vehicle group B, traveling in a procession at a higher speed than the first vehicle group A, catches up with the first vehicle group A, and travels parallel to them. Then, the radar waves emitted from the following vehicle 102B in the second vehicle group B may be reflected by the reflector of the leading vehicle 101A in the first vehicle group A, and the following vehicle 102B in the second vehicle group B may incorrectly recognize the leading vehicle 101A in the first vehicle group A as the leading vehicle 101B in its own procession.

To prevent the incorrect recognition of the preceding vehicle by the laser radar 2 and the reflector 3 (radar device), the fourth embodiment uses the following radar device. While the processional travel can be achieved by only a vehicle group identifying device using the radar device, the radar device may be used together with the vehicle to vehicle communication device described above.

Figure 12:
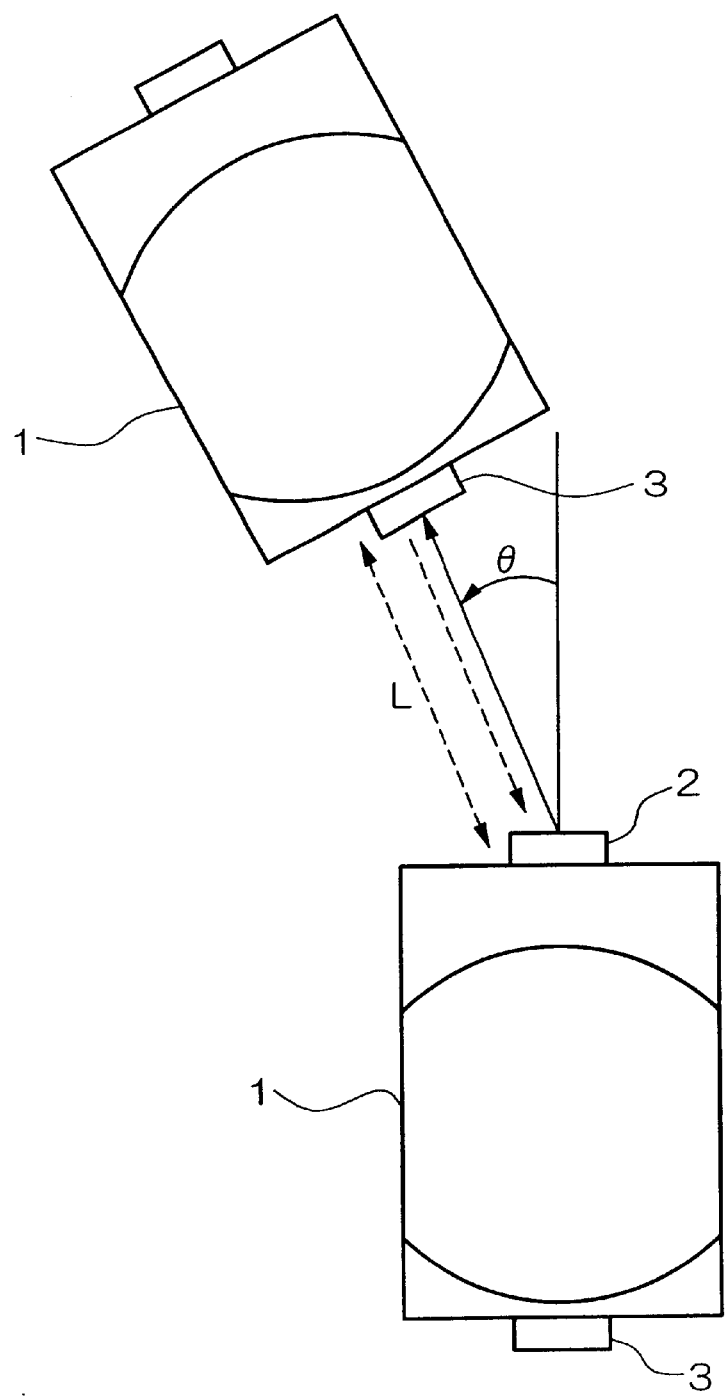
FIG. 12 is a diagram for explaining the calculation of the position of preceding vehicles by means of a radar device in the fourth embodiment of the present invention.

FIG. 12 shows the situation in which the radar device calculates the position of the preceding vehicle, and FIG. 13 shows the construction of the radar device which can switch modulation (between a pulse pattern AP and a pulse pattern BP). As shown in FIG. 12, the radar device emits laser light, which has short pulses, from the laser radar 2, the reflected light, which was reflected by the reflector 3 at the rear end of the preceding vehicle, is received, and a distance difference L between vehicles and a vehicle direction θ are measured. According to the theory of measuring the distance, a radar emitter is rotated while transmitting pulses modulated with a specified pattern at every predetermined rotation angle.

Figure 13A:
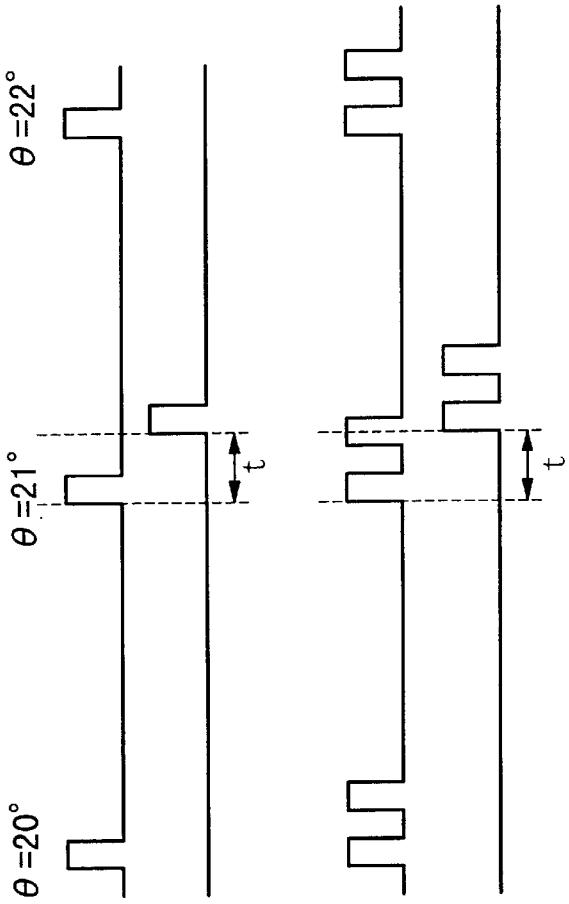
FIGS. 13A and 13B are time charts showing modulation patterns for signals transmitted from the radar device of the fourth embodiment of the present invention.
Figure 13B:
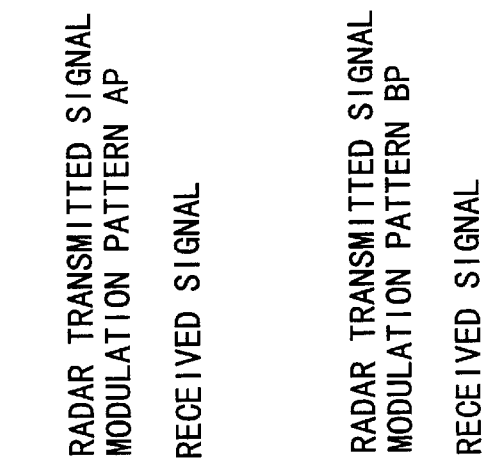

As shown in FIG. 13A, according to the pulse pattern AP, one pulse is output in every transmission scan. As shown in FIG. 13B, according to the pulse patter BP, two pulses are output in every transmission scan. In FIG. 13A, for example, when a signal is received at a timing which is slightly delayed from a transmission signal of θ=21, the preceding vehicle is positioned in the direction of 21 degrees, and is positioned at the distance L which is calculated from the response time t. In FIG. 13B, two pulses are transmitted and received, and the direction and distance of the preceding vehicle can be obtained in a manner similar to the process shown in FIG. 13A.

Figure 14A:
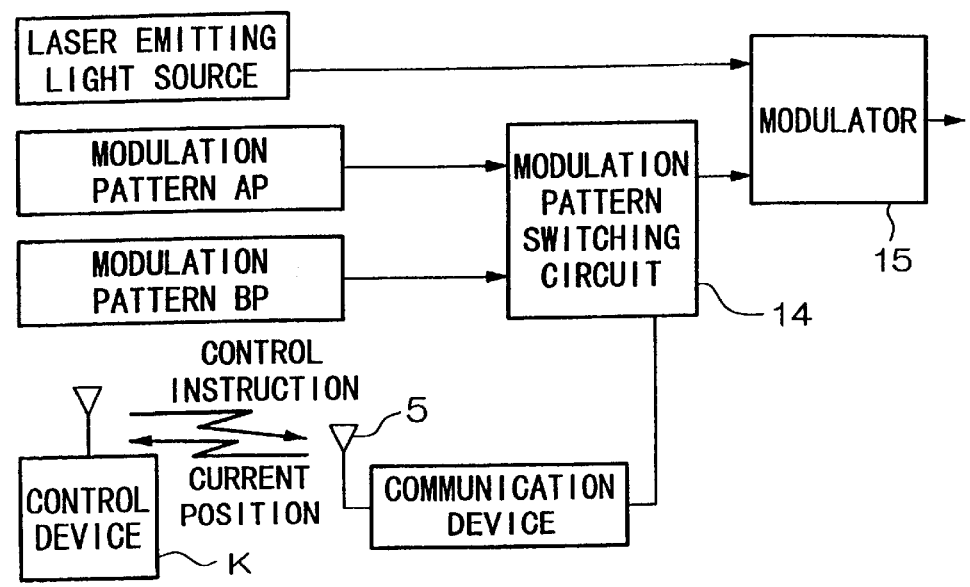
FIGS. 14A and 14B are block diagrams showing the construction of the radar device for switching the modulation of the fourth embodiment of the present invention.
Figure 14B:
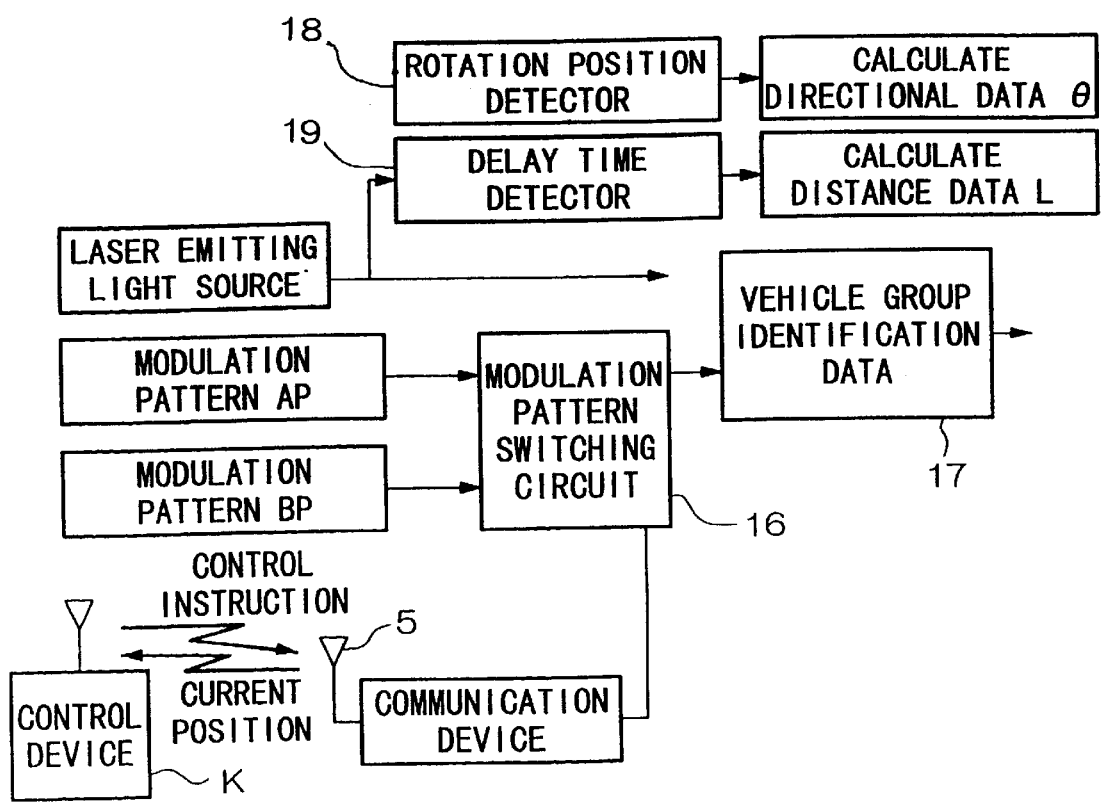

The construction of the radar device which can switch two pulse patterns will be explained with reference to the block diagram of FIGS. 14A and 14B. FIG. 14A shows a transmitter, and FIG. 14B shows a receiver. In FIG. 14A, an instruction, which is sent from the control device K via the road to vehicle antenna 5 and the communication device, is input to a modulation pattern switching circuit 14, for example the modulation pattern AP is selected, and a signal modulated with the modulation pattern AP by a modulator 15 is output from a laser transmission light source. On the other hand, in FIG. 14B, an instruction, sent from the control device K via the road to vehicle antenna 5 and the communication device, is input to a demodulation pattern switching circuit 16, for example the demodulation pattern AP is selected, and the signal from the laser receiver is demodulated into vehicle group identification data at 17. At that time, directional data θ is calculated, based on a detection signal from a rotation position detector 18, and distance data L is calculated, based on the signal from a delay time detector 19 in the laser receiver. Here, in a manner similar to FIGS. 5A and 5B, the position of the vehicle detected by the GPS/DGPS antenna 6 shown in FIG. 1 (which may be only the position of the leading vehicle) is transmitted from the road to vehicle antenna 5 shown in FIGS. 14A and 14B to the control device K.

For example, the vehicle group A adopts the pulse pattern AP as a default. When the vehicle group B travels parallel to the vehicle group A, the vehicle group B uses the pulse pattern BP so that the vehicle group B does not receive the reflected waves of the radar signal (pulse pattern AP) emitted from the vehicle in the vehicle group A, thereby preventing the incorrect recognition of the preceding vehicles in both vehicle groups. Although the pulse patterns must be different, the pulse patterns may be freely selected.

Figure 15:
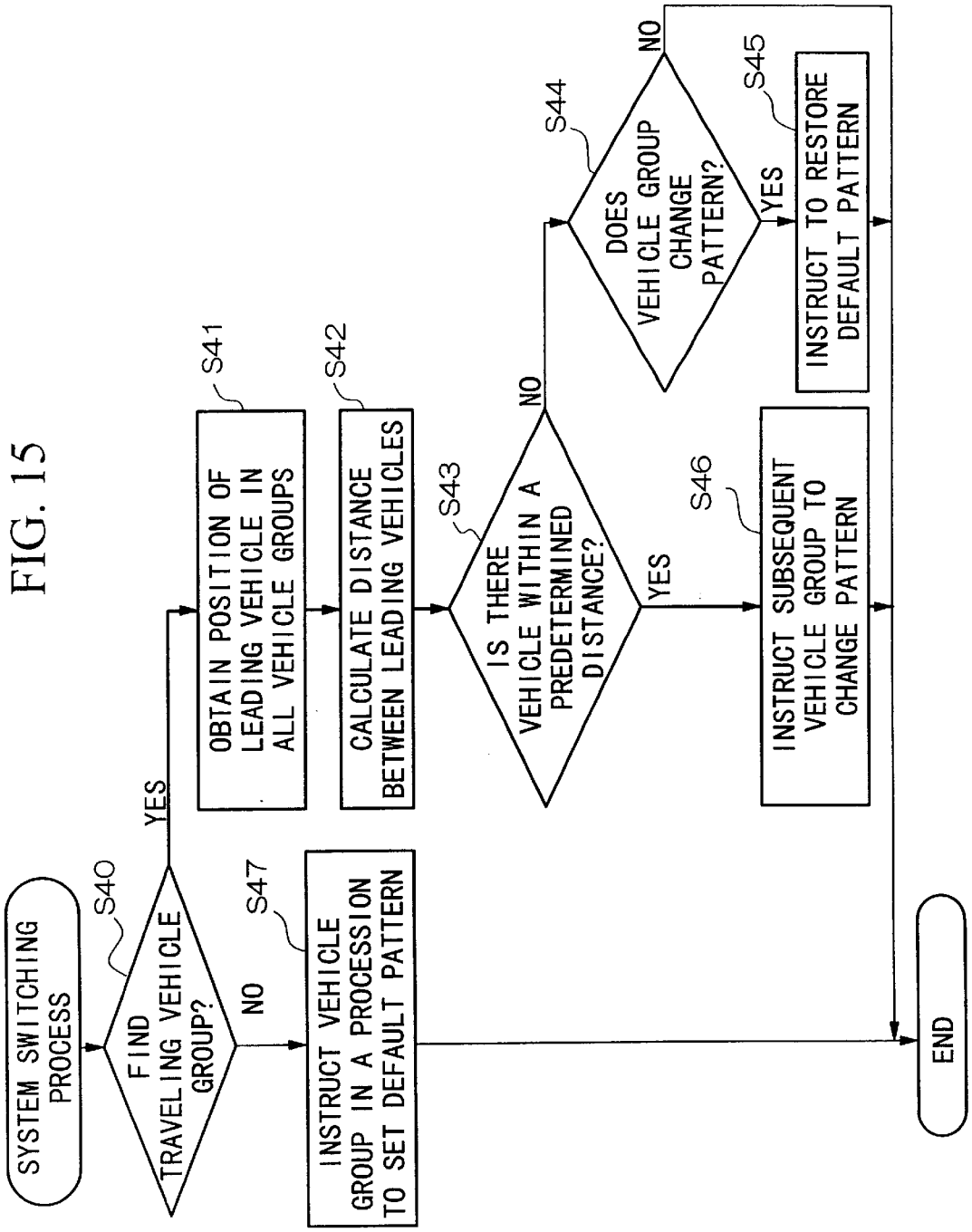
FIG. 15 is a flowchart showing the switching process carried out in the control device used in all the embodiments of the present invention.

The system switching process by the control device K is performed according to the flowchart of FIG. 15. Here, the system switching process by the control device K is the switching of the high frequency circuit shown in FIG. 5 in the first embodiment, the switching of the spreading code sequence shown in FIG. 6 in the second embodiment, and the switching of the modulation pattern shown in FIG. 14 in the fourth embodiment. The third embodiment does not include a switching process.

The switching operation is performed when the identification by the control device K becomes necessary, as described below. When starting processional travel, the settings of the processions are identical. Then, when the processions approach each other so that radio interference may occur, the respective processions can achieve the identification of the vehicles.

In step S40 of FIG. 15, it is determined whether there is a traveling vehicle group. When there is no traveling vehicle group, an instruction for setting the default pattern is sent to vehicles in a procession in step S47, and the process is completed.

When in step S40 there is a traveling procession, the positions of all the leading vehicles of the groups are obtained in step S41, and the flow proceeds to step S42, in which then the distance between the leading vehicles is calculated. The flow proceeds to step S43, and then it is determined whether there is a procession within a predetermined distance or not.

Each of the vehicles has a device for calculating information on its own position, based on an inertial navigation device, a GPS device, or a combination thereof. Based on the vehicle position information, the control device K calculates the distance between the leading vehicles, and determines whether the vehicle groups are approaching each other. The default pattern is, e.g., the pattern using the high frequency circuit 9 of the AS band in FIG. 5 in the first embodiment, the spreading code sequence AF in FIG. 6 in the second embodiment, or the modulation pattern AP shown in FIG. 13A in the fourth embodiment.

When in step S43 there is a vehicle group at a predetermined distance (an approaching vehicle group), an instruction to change the pattern is sent to the vehicles in the subsequent vehicle groups in step S46, and the process is completed. When in step S43 there is no vehicle group at a predetermined distance (an approaching vehicle group), the flow proceeds to step S44, in which then it is determined whether there is a vehicle group which has changed its pattern, and when in step S44 there is no vehicle group which has changed its pattern, the process is completed. When in step S44 there is a vehicle group which has changed its pattern, the flow proceeds to step S45, in which then an instruction to restore the default pattern is sent, and the process is completed.

According to the embodiments, by differentiating the frequencies for the vehicle to vehicle communications between the vehicle groups, by using the spread spectrum technique to allocate the spreading code sequence unique to the respective vehicle groups, by identifying the respective vehicle group, based on the transmission timing of the transmitted data by the communication interrupting process, or by changing the step pattern of the radar waves from the radar devices used in the vehicle groups, radio interference in the vehicle to vehicle communications between two vehicle groups can be prevented, and the problem that the vehicle group receives radar waves from another vehicle group can be avoided.

The vehicle groups are distinguished from each other according to the instruction from a control device, only when the vehicle groups approach each other so that radio interference may occur. Therefore, the control can be simpler than in the case in which frequencies are initially allocated to the respective vehicle groups when starting the processional travel.

The present invention is not limited to these embodiments described above. While the description is made by way of the example in which the vehicle groups are distinguished from each other when they approach each other, the respective vehicle groups may be identified when starting the processional travel in the first embodiment for switching the frequencies and in the second embodiment using the spreading code sequence. Further, in the fourth embodiment for switching the pulse pattern in the laser radar, the vehicle groups can be identified when starting the processional travel.

While in the first, second, and fourth embodiments the switching is performed in response to instructions from the control device K, the switching may be manually performed by input/output terminal devices mounted on the respective vehicles when starting the processional travel or traveling in a procession.

This invention may be embodied in other forms or carried out in other ways without departing from the spirit thereof. The present embodiments are therefore to be considered in all respects illustrative and not limiting, the scope of the invention being indicated by the appended claims, and all modifications falling within the meaning and range of equivalency are intended to be embraced therein.

What is claimed is:

1. A processional travel control apparatus that allows processional travel with a leading vehicle driven by a driver and at least one succeeding vehicle automatically following the leading vehicle, while maintaining distances and directions between said vehicles by means of radar devices, said leading vehicle and each said succeeding vehicle constituting a group, wherein each of the vehicles comprises:

a radar device provided with each of said leading and following vehicles; and
  a vehicle group identifying device for distinguishing said vehicle group from another vehicle group; said vehicle group identifying device preventing radio interference between said groups during processional travel; said apparatus further comprising:
    a control device for detecting the position of a traveling vehicle group; and
    an approach determining device for determining whether said vehicle group is approaching said other vehicle group so that radio interference will occur in communication using radar devices in the vehicle group, wherein
    when said approach determining device determines that the vehicle groups approach each other so that radio interference will occur, said vehicle group identifying device identifies the respective vehicle groups which approach each other when traveling in processions.

2. An apparatus according to claim 1, wherein said vehicle group identifying device distinguishes said vehicle groups from each other by at least one of differentiating frequencies for vehicle to vehicle communications between the vehicle groups, using a spread spectrum technique to allocate a spreading code sequence unique to each said vehicle group, based on a transmission timing of transmitted data by a communication interrupting process, and changing a step pattern of radar waves from the radar devices used in said vehicle groups,
  for thereby preventing said radio interference between said vehicle groups.

3. An apparatus according to claim 1, wherein each said vehicle group has a unique group identification associated therewith which is included in communications between said vehicles in said group.

4. An apparatus according to claim 3, further including a control device and, when starting processional travel, said control device determines a frequency band which is to be assigned to said vehicle group for communications between vehicles in said group based on said identification associated with said group.

5. An apparatus according to claim 4, wherein when said vehicle group and said other vehicle group approach each other, and when radio interference would occur between the groups, said control device changes the frequency band of one of said groups to avoid said radio interference.

6. An apparatus according to claim 1, wherein said vehicle group identifying device identifies the respective vehicle groups which approach each other when traveling in processions only when said approach determining device determines that the vehicle groups approach each other so that radio interference will occur.

7. A processional travel control apparatus that allows processional travel with a leading vehicle driven by a driver and at least one succeeding vehicle automatically following the leading vehicle, while said vehicles communicate with each other by vehicle to vehicle communication, said leading vehicle and each said succeeding vehicle constituting a group, wherein each of the vehicles comprises:

a communication device provided with each of said leading and following vehicles; and a vehicle group identifying device for distinguishing said vehicle group from another vehicle group, said vehicle group identifying device preventing radio interference between said groups during processional travel; said apparatus further comprising:

a control device for detecting the position of a traveling vehicle group; and an approach determining device for determining whether said vehicle group is approaching said other vehicle group so that radio interference will occur in vehicle to vehicle communication in the vehicle group, wherein when said approach determining device determines that the vehicle groups approach each other so that radio interference will occur, said vehicle group identifying device identifies the respective vehicle groups which approach each other when traveling in processions.

8. An apparatus according to claim 7, wherein said vehicle group identifying device distinguishes said vehicle groups from each other by at least one of differentiating frequencies for said vehicle to vehicle communications between the vehicle groups, using spread spectrum technique to allocate a spreading code sequence unique to each said vehicle group, based on a transmission timing of transmitted data by a communication interrupting process, and changing a step pattern of radar waves from radar devices used in said vehicle groups, for thereby preventing said radio interference between said vehicle groups.

9. An apparatus according to claim 7, wherein each said vehicle group has a unique group identification associated therewith which is included in communications between said vehicles in said group.

10. An apparatus according to claim 9, further including a control device and, when starting processional travel, said control device determines a frequency band which is to be assigned to said vehicle group for communications between vehicles in said group based on said identification associated with said group.

11. An apparatus according to claim 10, wherein when said vehicle group and said other vehicle group approach each other, and when radio interference would occur between the groups, said control device changes the frequency band of one of said groups to avoid said radio interference.

12. A processional travel control apparatus that allows processional travel with a leading vehicle driven by a driver and at least one succeeding vehicle automatically following the leading vehicle, while said vehicles communicate with each other by vehicle to vehicle communication, and while maintaining distances and directions between said vehicles by means of radar devices, said leading vehicle and each said succeeding vehicle constituting a group, wherein each of the vehicles comprises:

a radar device provided with each of said leading and following vehicles; and a vehicle group identifying device for distinguishing said vehicle group from another vehicle group, said vehicle group identifying device preventing radio interference between said groups during processional travel; said apparatus further comprising:

a control device for detecting the position of a traveling vehicle group; and an approach determining device for determining whether said vehicle group is approaching said other vehicle group so that radio interference will occur in vehicle to vehicle communication or in communication using radar devices in the vehicle group, wherein when said approach determining device determines that the vehicle groups approach each other so that radio interference will occur, said vehicle group identifying device identifies the respective vehicle groups which approach each other when traveling in processions.

13. An apparatus according to claim 12, wherein said vehicle group identifying device distinguishes said vehicle groups from each other by at least one of differentiating frequencies for said vehicle to vehicle communications between the vehicle groups, using a spread spectrum technique to allocate a spreading code sequence unique to each said vehicle group, based on a transmission timing of transmitted data by a communication interrupting process, and changing a step pattern of radar waves from the radar devices used in said vehicle groups, to thereby prevent said radio interference between said vehicle groups. said group.

14. An apparatus according to claim 12, wherein each said vehicle group has a unique group identification associated therewith which is included in communications between said vehicles in said group.

15. An apparatus according to claim 14, further including a control device and, when starting processional travel, said control device determines a frequency band which is to be assigned to said vehicle group for communications between vehicles in said group based on said identification associated with said group.

16. An apparatus according to claim 15, wherein when said vehicle group and said other vehicle group approach each other, and when radio interference would occur between the groups, said control device changes the frequency band of one of said groups to avoid said radio interference.

17. An apparatus according to claim 12, wherein said vehicle group identifying device distinguishes between vehicle groups traveling near to each other in the same direction.

\* \* \* \* \*

UNITED STATES PATENT AND TRADEMARK OFFICE
CERTIFICATE OF CORRECTION

PATENT NO. : 6,397,149 B1
DATED : May 28, 2002
INVENTOR(S) : Hideki Hashimoto

It is certified that error appears in the above-identified patent and that said Letters Patent is hereby corrected as shown below:

Title page,
Item [56], References Cited, FOREIGN PATENT DOCUMENTS, for document "0652543 A" change publication date from "10/1995" to -- 05/1995 --; for document "0698542 A" change publication date from "10/1996" to -- 02/1996 --.

Column 2,
Line numbered between 33 and 34, after "during" insert -- the --.

Column 3,
Line 2, change "group" to -- groups --.

Column 4,
Line 4, change "sent" to -- present --.
Line 47, change "are;" to -- are: --.

Column 5,
Line 29, delete "succeeding".
Line 52, change "groups," to -- groups. --.
Line 54, move "(see FIGS. 5A, 5B, 6A, 6B, 14A, 14B)" to between "K" and ",".

Column 8,
Line 1, after "embodiment" insert a comma.

Column 9,
Line 35, change "101 A" to -- 101A --.

Column 10,
Line 18, change "patter" to -- pattern --.

Column 13,
Line 51, before "spread" insert -- a --.

UNITED STATES PATENT AND TRADEMARK OFFICE
CERTIFICATE OF CORRECTION

PATENT NO. : 6,397,149 B1
DATED : May 28, 2002
INVENTOR(S) : Hideki Hashimoto

It is certified that error appears in the above-identified patent and that said Letters Patent is hereby corrected as shown below:

<u>Column 14,</u>
Line 46, delete "said group.".

Signed and Sealed this

Fourteenth Day of January, 2003

JAMES E. ROGAN
*Director of the United States Patent and Trademark Office*